(12) United States Patent
Green et al.

(10) Patent No.: US 10,165,607 B2
(45) Date of Patent: Dec. 25, 2018

(54) MULTI CHANNEL COMMUNICATIONS FOR VEHICULAR RADIO COMMUNICATIONS FOR BI-DIRECTIONAL COMMUNICATIONS WITH LOCAL WIRELESS DEVICE

(71) Applicant: Visteon Global Technologies, Inc., Van Buren Township, MI (US)

(72) Inventors: Martin Nicholas Green, Billericay (GB); Keith John Green, Maldon (GB); Fabrice Pointet, Cologne (DE)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 0 days.

(21) Appl. No.: 15/285,836

(22) Filed: Oct. 5, 2016

(65) Prior Publication Data

US 2017/0099686 A1    Apr. 6, 2017

(30) Foreign Application Priority Data

Oct. 5, 2015    (GB) .................................. 1517560.7

(51) Int. Cl.
*H04W 76/10*    (2018.01)
*H04L 5/14*    (2006.01)
(Continued)

(52) U.S. Cl.
CPC ............... *H04W 76/10* (2018.02); *H04L 5/14* (2013.01); *H04L 27/0014* (2013.01);
(Continued)

(58) Field of Classification Search
CPC . H04W 76/10; H04W 76/0453; H04W 48/18; H04W 4/046; H04W 84/047;
(Continued)

(56) References Cited

U.S. PATENT DOCUMENTS

| 7,801,556 B2 | 9/2010 | Tran |
| 2010/0120466 A1 | 5/2010 | Li |
| 2014/0179239 A1* | 6/2014 | Nickel .................. H04W 24/00 455/67.14 |

FOREIGN PATENT DOCUMENTS

| JP | 2010081435 A | 4/2010 |
| KR | 10-2012-0027738 A | 3/2012 |

(Continued)

*Primary Examiner* — Christopher M Crutchfield
*Assistant Examiner* — Tito Q Pham
(74) *Attorney, Agent, or Firm* — Dickinson Wright PLLC

(57) ABSTRACT

A vehicular radio communications system establishes a bi-directional digital radio communications link between a local wireless communication device inside a moving vehicle and a sequence of radio transceivers in a wireless network. The local device operates in a plurality of different device frequency bands and the external transceivers operate in a plurality of different network frequency bands. Some or all of the device frequency bands are the same as some or all of the network frequency bands. The system comprises a set of one or more external radio antennas operating in an external downlink and an external uplink using a network frequency band and a set of one or more local radio antennas operating in a local downlink and a local uplink using a local frequency band different from the network band.

13 Claims, 4 Drawing Sheets

(51) Int. Cl.
*H04L 29/08* (2006.01)
*H04W 72/04* (2009.01)
*H04L 27/00* (2006.01)
*H04W 48/18* (2009.01)
*H04W 4/04* (2009.01)
*H04W 84/04* (2009.01)

(52) U.S. Cl.
CPC ......... *H04L 67/12* (2013.01); *H04W 72/0453* (2013.01); *H04L 2027/0026* (2013.01); *H04W 4/046* (2013.01); *H04W 48/18* (2013.01); *H04W 84/047* (2013.01)

(58) Field of Classification Search
CPC ....... H04L 5/14; H04L 67/12; H04L 27/0014; H04L 2027/0026
See application file for complete search history.

(56) References Cited

FOREIGN PATENT DOCUMENTS

| | | |
|---|---|---|
| WO | 2013/089891 A1 | 6/2013 |
| WO | 2015/015229 A1 | 2/2015 |

\* cited by examiner

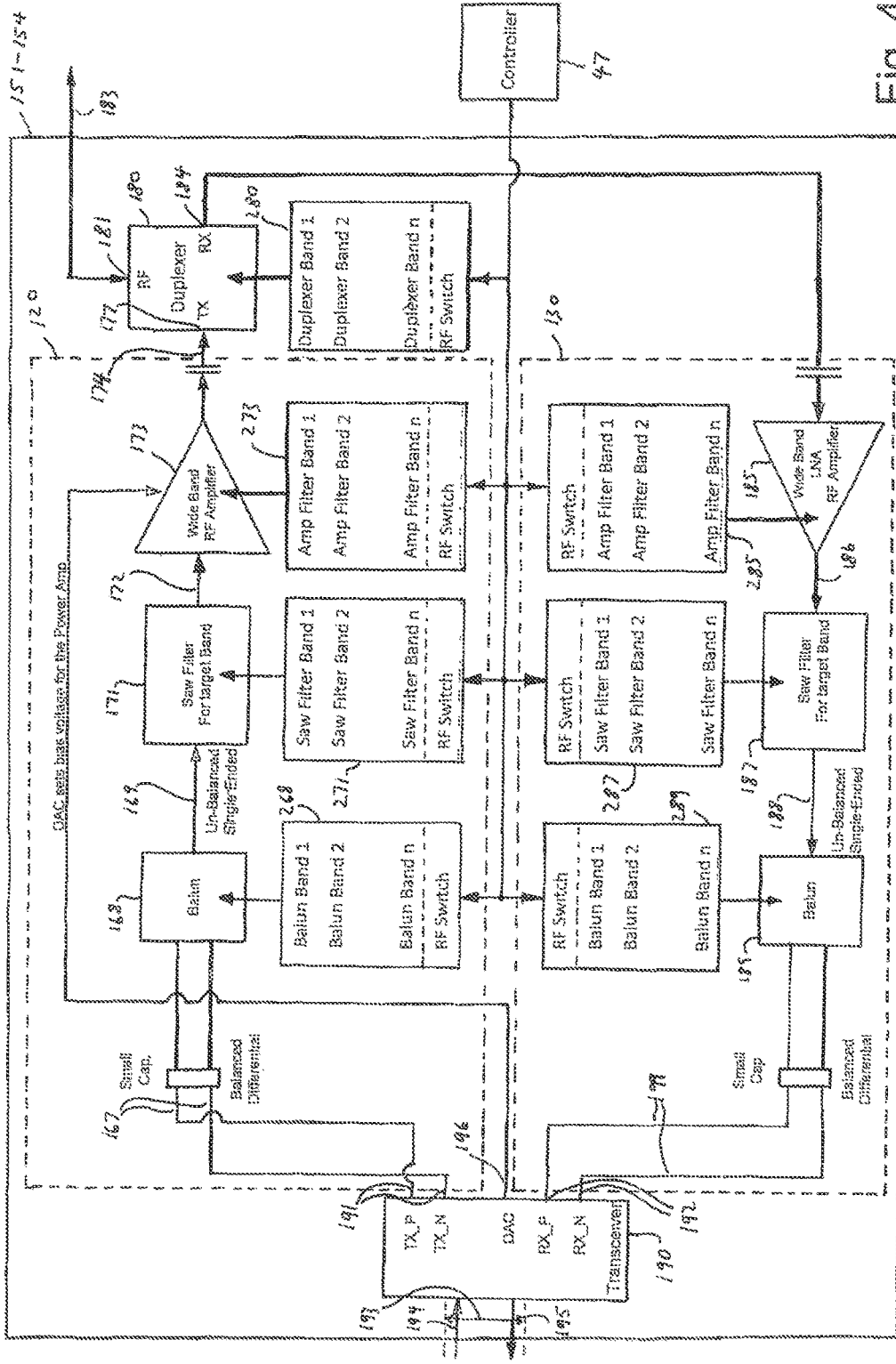

MULTI CHANNEL COMMUNICATIONS FOR VEHICULAR RADIO COMMUNICATIONS FOR BI-DIRECTIONAL COMMUNICATIONS WITH LOCAL WIRELESS DEVICE

CROSS-REFERENCE TO RELATED APPLICATION

This application claims priority to United Kingdom Patent Application No. 1517560.7 filed Oct. 5, 2015, and entitled "MULTI CHANNEL COMMUNICATIONS," which is herein incorporated by reference.

BACKGROUND

The present disclosure relates to vehicular radio communications systems for establishing a bi-directional digital radio communications link between a local wireless communication device inside a moving vehicle and a sequence of radio transceivers in a wireless network external of said vehicle.

Cars currently can have multiple external antennas for various different purposes, for example: receiving and sending LTE (long term evolution) cellular transmission as in the 4G mobile communications standard; receiving digital audio broadcasts (DAB) or other digital audio broadcast, such as HD Radio (Reg. TM); and receiving and sending data in a wide area network (WLAN), for example by using WiFi (Reg. TM).

It is known to use multiple external antennas, and two is usual, when receiving so that frequencies can be switched when coming into range of a better signal. An additional "sniffing" antenna can be used to monitor signal strength across a range of frequencies.

Cars can have multiple internal antennas for retransmitting the signals inside the vehicle. Clearly, the same frequencies cannot be used simultaneously both inside and outside the vehicle or else there will be interference. Different frequencies are therefore used internal to the vehicle.

Some types of electronic component used with in-vehicle communications system are relatively expensive. The simplest, but most expensive, way of providing receive/transmit paths both inside and outside the vehicle is to use many separate receive RF paths and many separate RF transmit paths, both for inside and outside the vehicle. The conventional approach is for each antenna to have its own, separate RF circuitry covering all the bands and frequencies for that antenna. However, when the RF paths are all separate, there can be the need for many of the relatively expensive RF power amplifiers, not to mention duplication of less expensive components.

It would be desirable to have a solution which is "worldwide" so that the same "box" can be supplied to an auto manufacturer regardless of where in the world the vehicle will be sold. LTE 4G mobile is a particular problem as there are currently 45 bands globally. Each band covers a spread of frequencies. There is one cluster of LTE bands between 700 MHz and 950 MHz, and another cluster about 1.4 GHZ and about 2.7 GHZ and a few at between about 3.4 GHz and 3.8 GHz. When there is a single antenna, 90 RF paths (receive and transmit) would be needed external to the vehicle and 90 RF paths internal to the vehicle in order to provide functionality across all 45 bands. In practice, different regions of the world have different combinations of bands, so not all paths would need to be implemented if a vehicle is to be used in just one of these regions. However, as there is a desire to standardise vehicular components worldwide, as far as possible, in principle this would require all equipment implementing all 90 paths, both externally and internally to the vehicle.

With two antennas both external and internal, these numbers double. To this can be added the requirement to provide for WiFi communication with additional antennas and circuitry. There are currently two WiFi bands, but this will probably expand to 5 to 7 in a few years.

SUMMARY

According to the aspects disclosed herein, there is provided a vehicular radio communications system for establishing a bi-directional digital radio communications link between a local wireless communication device inside a moving vehicle and a sequence of radio transceivers in a wireless network external of said vehicle, said local device operating in any one of a plurality of different device frequency bands and said radio transceivers each operating in any one of a plurality of different network frequency bands such that different radio transceivers have different network frequency bands of operation, some or all of said device frequency bands being the same as some or all of said network frequency bands, wherein the vehicular radio communications system comprises:

a set of one or more external radio antennas for radio communication with said network, each external radio antenna being configured for operation in any of said network frequency bands and each being operable, in use, to receive and transmit radio signals in, respectively, an external downlink and an external uplink thereby providing, in use, an external radio communications link using said network frequency band of operation, said network frequency band of operation changing in accordance with said sequence of radio transceivers as said vehicle moves;

a set of one or more local radio antennas for radio communication with said local device, each local radio antenna being configured for operation in any of said device frequency bands and each being operable, in use, to receive and transmit radio signals in, respectively, a local downlink and a local uplink thereby providing, in use, a local radio communications link using said device frequency band of operation, said device frequency band of operation changing in accordance with said changes in said network frequency band of operation so as to be different from said network frequency band of operation;

a bi-directional processor configured to process signals received from the local downlink for transmission in the external uplink and to process signals received from the external downlink for transmission in the local uplink;

a plurality of selectable radio-frequency interfaces, each one of said radio-frequency interfaces being configured for operation in a different frequency band and comprising a duplex processor interface and a duplex antenna interface, said duplex processor interface being selectively connectable to said processor and said duplex antenna interface being selectively connectable to any of said radio antennas of both of said sets of antennas, and said plurality of radio-frequency interfaces comprises: (i) a first selected radio-frequency interface comprising a first duplex processor interface and a first duplex antenna interface connected respectively to said processor and to a first radio antenna, said first radio antenna being in said set of external radio antennas; and (ii) a second selected radio-frequency interface comprising a second duplex processor interface and a second duplex antenna interface connected respectively to said processor and to a second radio antenna, said second radio antenna being in said set of local radio antennas;

a switching system configured to switch any of said selectable radio-frequency interfaces into connection between said processor and the corresponding radio antenna to maintain the external radio communications link when the network frequency band of operation changes and to maintain the local radio communications link when the device frequency band of operation changes;

a control system, the control system being connected to the switching system and being configured to select which of said selectable radio-frequency interfaces will be switched by the switching system so that the device frequency band of operation continues to be different from the network frequency band of operation when there is to be a change in the network frequency band of operation, whereby the first selected radio-frequency interface is one that is configured for duplex operation at the network frequency band of operation and the second selected radio-frequency interface is one that is configured for duplex operation at the device frequency band of operation, said bi-directional digital radio communications link, in use, thereby being provided through said first and second radio-frequency interfaces and said radio signal processor as said external and local radio communications links are maintained by the switching system under the control of the control system.

Although the change in the network frequency band of operation will, in most cases, be due to movement of the vehicle relative to the external transceivers, the change may sometimes be necessitated by other factors, for example external factors such as weather, radio interference, and a change may also be required on account of the cost or quality of the data service.

The vehicular radio communications system may comprise at least two radio antennas in said set of external radio antennas. This may, alternatively or additionally, comprise at least two radio antennas in said set of internal radio antennas.

The plurality of radio-frequency interfaces may comprises: (i) a third selected radio-frequency interface comprising a third duplex processor interface and a third duplex antenna interface connected respectively to said processor and to a third radio antenna, said third radio antenna being in said set of external radio antennas; and (ii) a fourth selected radio-frequency interface comprising a fourth duplex processor interface and a fourth duplex antenna interface connected respectively to said processor and to a fourth radio antenna, said fourth radio antenna being in said set of local radio antennas.

The duplex operation will in general comprise a port for receiving from the antenna a downlink radio signal and providing to the antenna an uplink radio signal.

Each antenna may have has a frequency response that is optimised for a plurality of specific frequency band. Therefore, there may, in each antenna set, be just one antenna covering all frequency bands.

The duplexer may be a half duplexer, in which either the uplink amplifier or the downlink amplifier is silenced in order to avoid cross-talk between the uplink and downlink amplifiers. However, it will most usually be the case that the duplexer is a full duplexer to permit the radio transceiver amplifier circuit to both receive and transmit at the same time, as is the case, for example, in mobile telephony.

Each of the selectable radio-frequency interfaces may be configured for fixed operation in a single frequency band.

In one preferred embodiment, the frequency response of each radio frequency interface is fixed, and the control system switches the selectable radio-frequency interfaces into connection between said processor and the corresponding radio antenna so that the selected radio-frequency interface matches the frequency response of each interface to the required frequency band to be used by using the switching system to switch the duplex input/output of each interface to the appropriate or optimal antenna for the required frequency band in either one of the first or second sets of antennas. This aspect of the invention therefore makes use of the fact that since the frequency bands of operation in the external and local radio communications links must be different in order to avoid radio interference, it is possible to halve the number of required interfaces if there is just one interface for each required band and if the switching system is capable of connecting each interface, as required to either the first set of antennas for the external radio communications link, or the second set of antennas for the local radio communications link. Any of the transmit paths and the receive paths not being used in one of the interfaces are then available for use in the other interface.

In one embodiment, each of the radio-frequency interfaces is a tuneable multi-frequency interface configured for frequency tuneable operation in a plurality of different frequencies bands.

The control system may be operatively connected to each tuneable multi-frequency interface, in which case the control system controls the frequency response of each interface to the required frequency band of operation.

In this preferred embodiment each of the first and second radio-frequency interfaces is a frequency-tuneable interface capable of being tuned or adjusted to operate at any one of a plurality of different operating frequency bands. In this case, the control system is operatively connected to each tuneable multi-frequency interface, and the control system matches the frequency response of each interface to the required frequency band to be used by changing the operating frequency band of each interface.

The vehicular radio communications system may therefore comprise a frequency adjustment system for adjusting the operational frequency of filters and/or amplifiers of said interface and the control system is connected to each of said frequency adjustment systems and is configured to coordinate the adjustment of said operational frequencies of said of filters and/or amplifiers in accordance with said changes in said frequency bands to be used.

The control system may be operable, in use, to change the frequency response of a receiver amplifier and/or a transmitter amplifier within the radio-frequency interface to match said changes in the network frequency band of operation.

The control system may be operable, in use, to change the frequency response of at least one frequency filter circuit selectably linkable to the receiver amplifier and/or at least one selectable frequency filter circuit selectably linkable to the transmitter amplifier, the control system being operable, in use, to select which of these frequency filter circuits is linked to the amplifiers in order to change the frequency response of the receiver amplifier and/or the transmitter amplifier.

Each radio-frequency interface may comprise between the duplex processor interface and the duplex antenna interface a transceiver system, the transceiver system comprising a transceiver amplifier circuit, said circuit comprising a receive path and a transmit path, the receive path including a receiver amplifier being configured to amplify a downlink radio signal received from the duplex antenna interface and to provide said amplified signal to the duplex processor interface. The transmit path includes a transmitter amplifier that is configured to amplify the uplink radio signal received from the duplex processor interface and to provide the amplified signal to the duplex antenna interface.

In a preferred embodiment, the switching system comprises, between said radio frequency interfaces and the bi-directional processor, a processor multiplexer.

The processor multiplexer may then be connected to the duplex processor interface.

The processor multiplexer is preferably connected to a coder/decoder interface of the bi-directional processor.

In a preferred embodiment, the switching system comprises, between said radio frequency interfaces and the sets of antennas, an antenna multiplexer.

BRIEF DESCRIPTION OF THE DRAWINGS

The invention will now be further described, by way of example only, and with reference to the accompanying drawings, in which:

FIG. 4 shows a variant of the radio-frequency interfaces of FIG. 3, in which the frequency response of each of the radio-frequency interfaces is tuneable under the control of the system controller.

DETAILED DESCRIPTION

Figure 1:
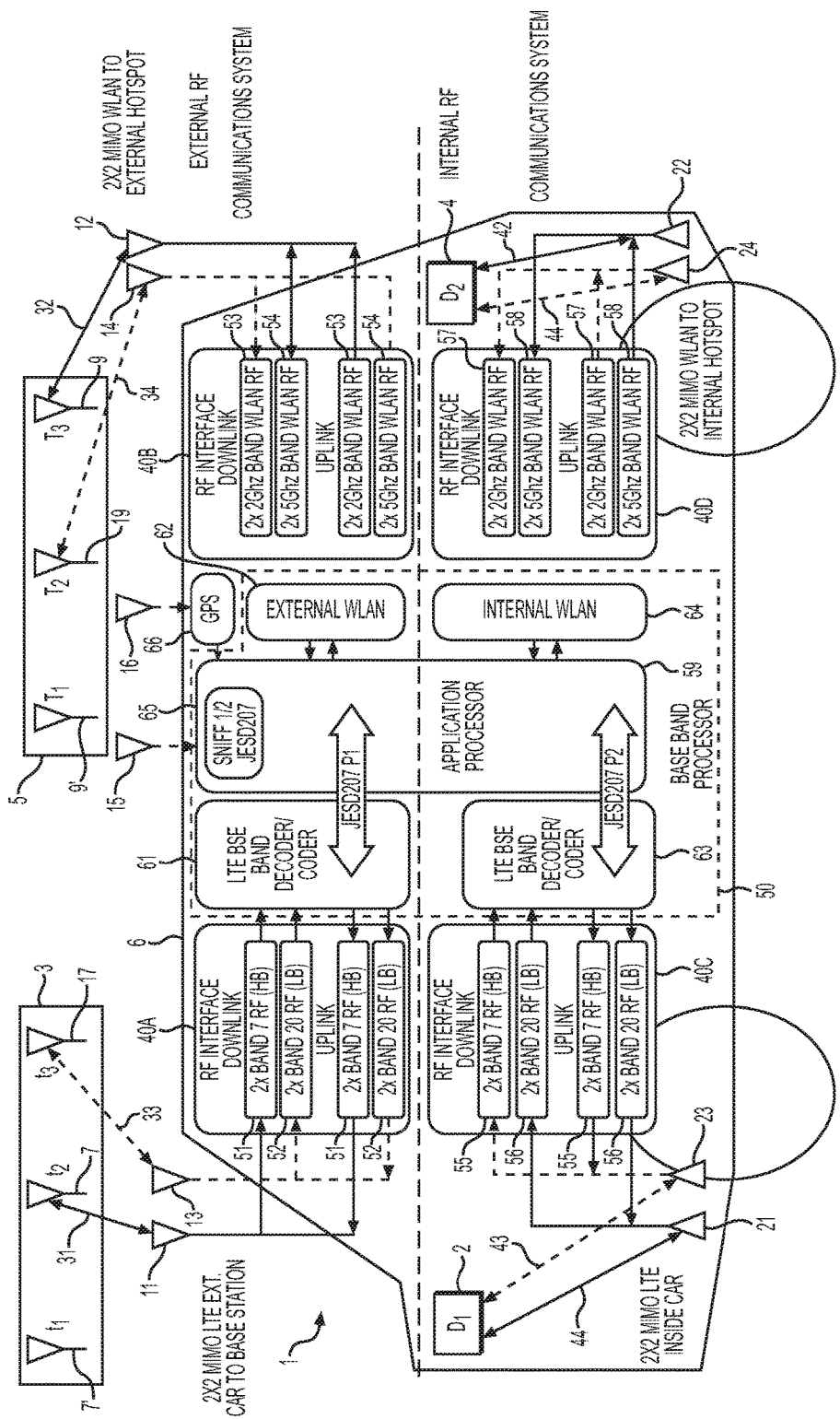
FIG. 1 is a schematic representation of a prior art vehicular radio communications system for establishing a bi-directional digital radio communications link between a local wireless communication device inside a moving vehicle and a sequence of radio transceivers in a wireless network external of said vehicle, in which each radio frequency (RF) communications path is through a multiplexed RF interface operable in a plurality of different bands.

FIG. 1 of the drawings shows a known vehicular radio communications system 1 for establishing a bi-directional radio digital communications link between a two local wireless communication devices $D_1$ and $D_2$ 2, 4 inside a moving vehicle 6 and two corresponding wireless networks 3, 5 external of the vehicle. In this example, a first one of the devices $D_1$ is a mobile telephone 2 in communication through a first antenna 11 with a first mast t2 7 in a cellular telephone network 3 and the second one of the devices is a tablet computer in communication through a second antenna 12 with a first WiFi (Reg. TM) hotspot T2 9 in a WLAN network 5.

Each of the digital communications links may comprise one or more additional antennas and in this example the cellular communications link has a third antenna 13 and the WLAN communications link has a fourth antenna 14.

In this example, both communications links use multiple-input and multiple-output, or MIMO communications standards, for example using long term evolution (LTE) (the cellular 4G standard) for the cellular telephone network 3. The particular type of digital communications standard used is not a particular feature of the invention to be described below, and is given purely as an example.

As the vehicle moves relative to the external wireless networks 3, 5 having a plurality of transceivers 7, 7', 17, 9, 9', 19 it becomes necessary to switch to a new network antenna 17, 19 as signal strength from the current antenna 7, 9 drops, and the next antenna will, in general, use a different frequency band than the current antenna. When a switch is to be made, this may be accomplished using the same vehicle external antenna 11, 12 or another vehicle external antenna 13, 14. The illustrated example shows the case where a different vehicle antenna is used when frequencies are to be changed. If the same vehicle antenna is to be used, then the system will require additional multiplexing stage by which the same antenna can be switched between different interfaces.

In this example, in additional to the two pairs of external digital communications antennas 11, 13 and, 12, 14, there are also two corresponding pairs of internal or local digital communications antennas 21, 23 and, 22, 24 within the vehicle itself, each pair being for local radio communication with the two devices 2, 4.

In this simplified example, only one antenna of each pair could be used at any one time. This is because this example provides just two radio frequency (RF) bands for each of the two radio digital communications links. Each RF band employs two different frequencies: one for transmit (the "high band" or HB) and one for receive (the low band or LB). An external radio link 31, 32 in use must therefore use a different band to an internal radio communications link 41, 42 in use. This difference must be maintained when radio frequencies change so that the bands used in the next external radio links 33, 34 continue to employ different bands to those to be used in the next internal radio communications links 43, 44.

As can be seen from FIG. 1, with two bands for each of two different radio communications networks, 3, 5, there is the need for eight different RF interfaces 51-58 each of which has a transmit, or uplink portion and a receive, or downlink portion, from the respective internal and external antennas. As is known in the art, each receive/transmit interface will have an antenna interface in the form of a duplex processor for separating the receive and transmit signals.

Signals are passed between external RF interfaces 51-54 and internal RF interfaces through a bi-directional signal processor system 50. In this description, this system is referred to as a base band processor 50. This bi-directional signal processor system includes a main processor 59, and interface stages 61-64 to which of the external RF interfaces 51-58 is connected. The interface stages include LTE base band decoders and coders 61, 63 for cellular communication and external and internal WLAN decoders and coders 62, 64 for WLAN communication.

Optionally, there may be additional antennas, such as a sniffing antenna 15 and a GPS antenna 16. The sniffing antenna 15 is connected to an interface 65, which may be built into the application processor 59, and is used by the application processor to measure signal strengths from the antennas 7', 7, 17 in the cellular telephone network 3, so that the application processor can coordinate the switching of communication bands as different external signal strengths increase or diminish. The GPS antenna 16 is connected to a GPS receiver 66 which may provide signals to different devices inside the vehicle, for example a navigation system (not illustrated) and the application processor 59.

The main processor in this example is referred to as application processor 59. Although the term "base band processor" is sometimes used specifically for this main processor, in this description the term "base band processor" is encompasses both the main processor and any necessary associated interface stages 61-64 for connection to the RF interfaces 51-58.

In practice, more than just two different bands will be required in each national market, for example, between about 8 and 12 bands. In the system of FIG. 1, this would require between about 16 and 24 bi-directional RF interfaces. To provide a system that could be installed in vehicles worldwide it would be necessary to provide coverage of 45 bands in the MIMO-LTE cellular 4G standard, and this in turn would require 90 bi-directional RF interfaces.

In FIG. 1, the eight RF interfaces 51-58 are illustrated as grouped into four RF interface blocks, labelled as 40A, 40B, 40C, 40D. It will be appreciated, however, that the RF interfaces may all be provided in a single integrated circuit chip.

Figure 2:
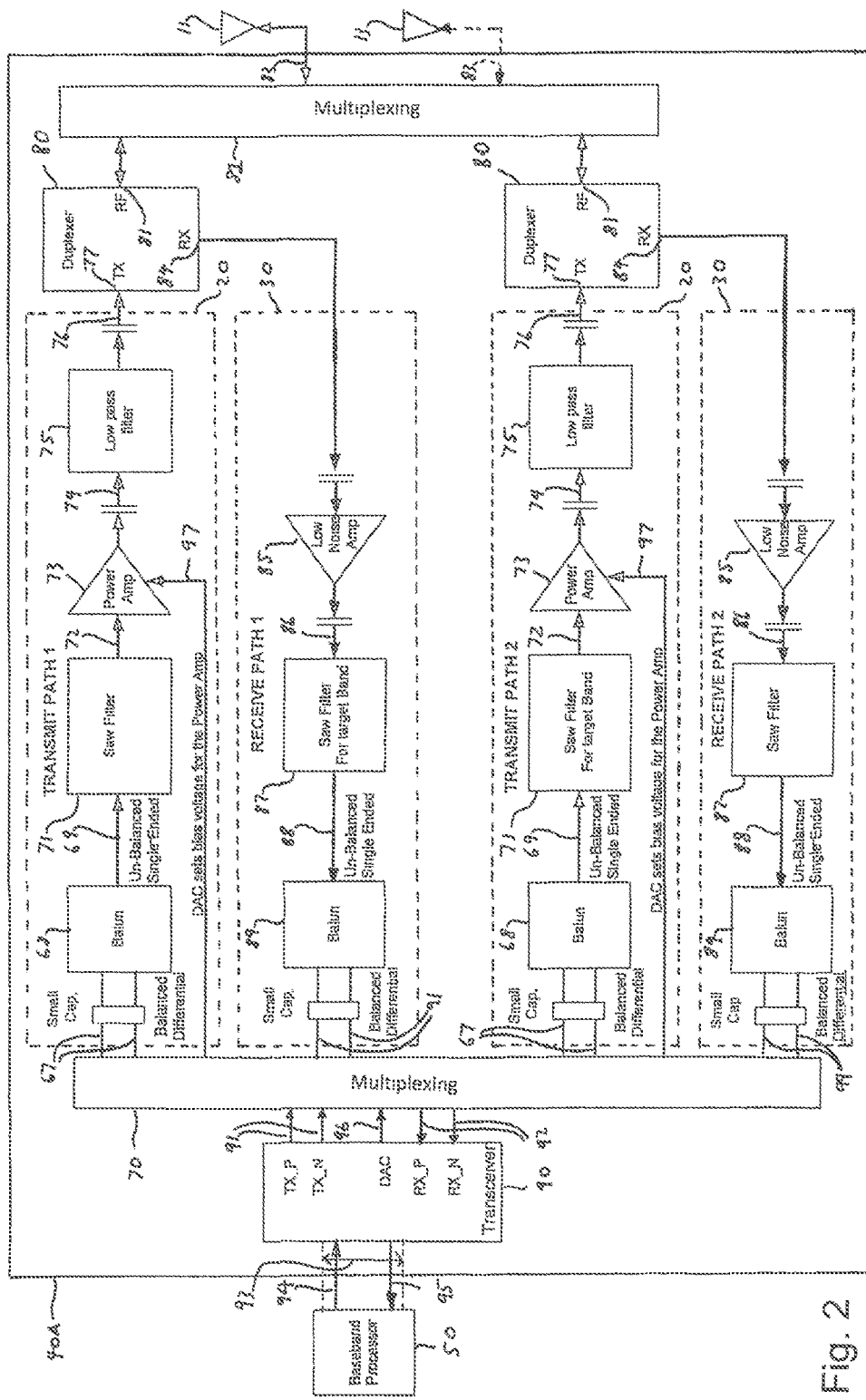
FIG. 2 is a schematic circuit diagram showing the components of one of the multiplexed RF interfaces, having two selectable radio-frequency interfaces, each being configured for operation in a different frequency band.

Although the internal and external receive/transmit RF powers are very different it is possible to use the same circuit components in each of the RF interfaces, as long as the circuitry has appropriate gain control. FIG. 2 shows one conventional arrangement of circuit components for one of the illustrated RF interface blocks 40A, and also how these components are connected to the base band processor 50 and to two of the antennas 11, 13. The components are grouped into two transceivers each of which has a transmit path 20 and a receive path 30, these paths extending between an input multiplexer 70, which is at the base band processor end of each path 20, 30, and a duplexer 80, which is at the antenna end of each path. The input multiplexer 70 is common to all the receive and transmit paths 20, 30. The transmit path 20 receives a balanced differential digital signal 67 from the input multiplexer which passes through a balun 68 and is converted into a unbalanced single ended signal 69. The single ended signal is filtered by a saw (surface acoustic wave) filter 71, and the filtered signal 72 is then amplified by an RF power amplifier 73. The output 74 from the power amplifier is filtered by a low pass filter 75, and the filtered output 76 is then provided to a transmit input TX 77 of the duplexer 80.

Saw filters are electromechanical devices commonly used in radio frequency applications. Electrical signals are converted to a mechanical wave in a device constructed of a piezoelectric crystal or ceramic; this wave is delayed as it propagates across the device, before being converted back to an electrical signal by further electrodes. The delayed outputs are recombined to produce a direct analog implementation of a finite impulse response filter. This hybrid filtering technique is also found in an analog sampled filter. SAW filters are limited to frequencies up to 3 GHz.

As an alternative to saw filters, it is possible to use baw (bulk acoustic wave) filters, which are also electromechanical devices. Baw filters can implement ladder or lattice filters. Baw filters typically operate at frequencies from around 2 GHz to around 16 GHz, and may be smaller or thinner than equivalent saw filters.

Each duplexer 80 has an RF transceiver input/output RF 81 that is connected to an output multiplexer 82 which is configured to provide and receive signals 83 from one of the antennas 11, 13 at a time.

On the receive path 30, a receive output RX 84 from the duplexer 80 is provided to a low noise RF amplifier 85. The output 86 from the low noise amplifier is filtered by a saw filter 87, and the filtered signal 88, which is an unbalanced signal-ended signal, is then provided to a balun 89 and is converted into a balanced digital signal 99 and then provided to the input multiplexer 70.

The input multiplexer 70 receives and provides digital signals from a transceiver interface 90. These signals include balanced digital signals for transmit data TX_P and TX_N 91 and receive data RX_P and RX_N 92.

The transceiver interface 90 is connected by a data bus 93 to the base band processor 50. Data signals 94, 95 between the transceiver and base band processor 50 include data sent to and received from the antenna 11, 13 that is in use, as well as control signals to the input multiplexer 70 to select which one of the paired transmitter and receive paths 20, 30 will be used. The control signals also control a digital-to-analog converter (DAC) output 96 from the transceiver interface 90 which is passed as an analog control signal 97 by the multiplexer to the RF power amplifier 73 that is in use in order to control the gain of the amplifier and hence strength of the transmit signal 83 from the antenna 11, 13 that is in use.

Some of the components of the transceiver circuitry, in particular the high power and low noise RF amplifies 73, 85, are relatively expensive, which may make it commercially impractical to provide hardware that can used anywhere in the world or with multiple different type of external network 3, 5.

Figure 3:
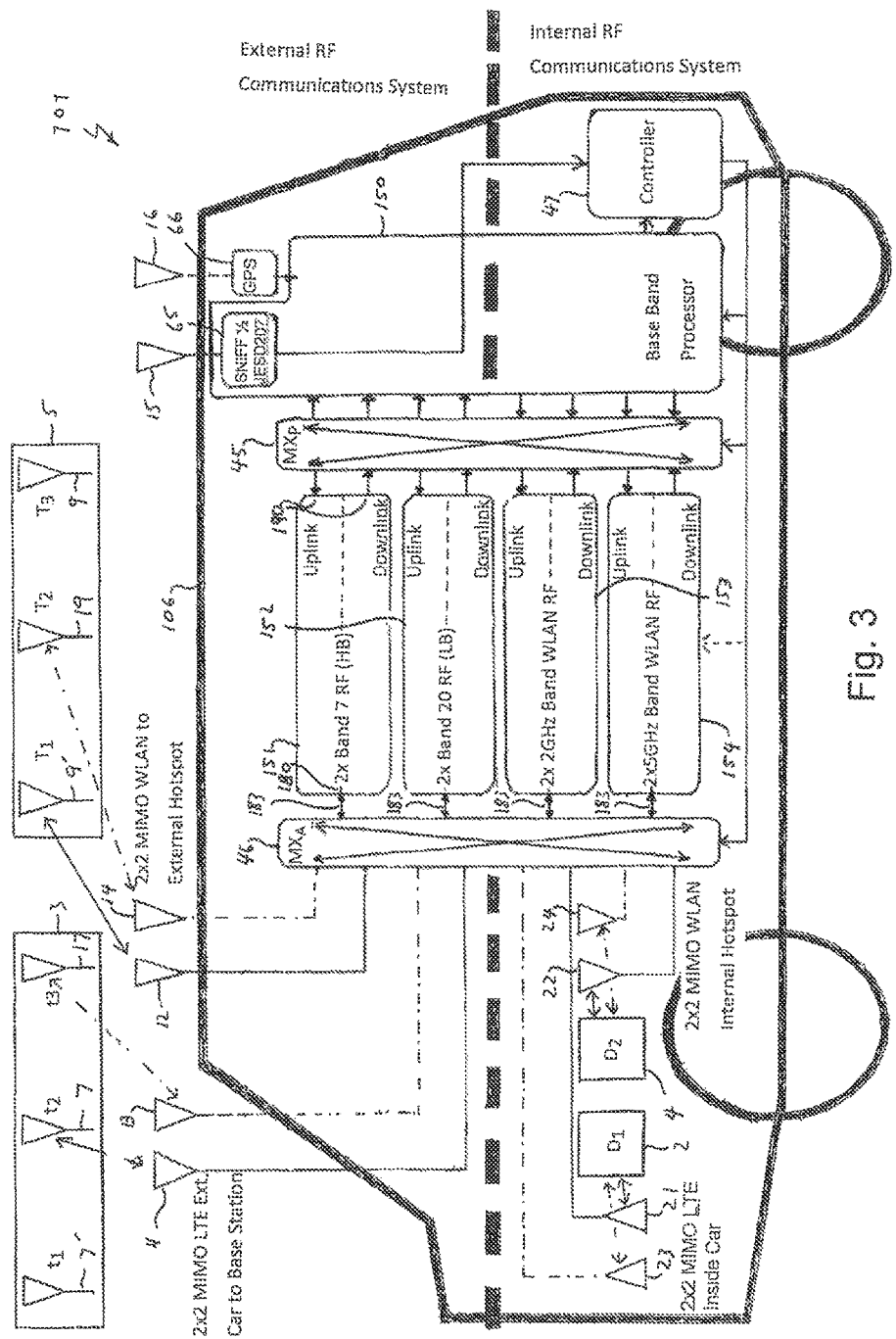
FIG. 3 is a schematic representation of a vehicular radio communications system according to a preferred embodiment of the invention, for establishing a bi-directional digital radio communications link between a local wireless communication device inside a vehicle and a sequence of radio transceivers in a wireless network external of said vehicle, in which a plurality of radio-frequency interfaces is multiplexed and available for use in both internal and external communications paths within the vehicle under the control of a system controller.

A preferred embodiment of the invention, as illustrated in FIG. 3, therefore provides a vehicular radio communications system 101 which makes more efficient use of radio-frequency interfaces. In FIG. 3, features which are the same as those of FIG. 1 are indicated using the same reference numerals, and for the sake of clarity may not therefore be fully described again.

The vehicular radio communications system 101 includes a bi-directional processor 150, which is in this example a base band processor, configured to process signals received from a local downlink from one or more in-vehicle devices D1, D2 2, 4 for transmission in an external uplink and to process signals received from an external downlink for transmission in the local uplink.

The system 101 includes a plurality of selectable radio-frequency (RF) interfaces 151-154, each one of which is configured for operation in a different frequency band. FIG. 4 shows an example of one of the RF interfaces 151-154, which preferably all use the same components and construction.

Each RF interface 151 has a duplex processor interface 190, similar to the transceiver 90 described above, and a duplex antenna interface 180, similar to the duplexer 80 described above.

The duplex processor interface 190 of each RF interface is selectively connectable to the bi-directional processor 150 through a first multiplexer 45, or "processor multiplexer" $MX_P$. The duplex antenna interface 180 is selectively connectable to both internal and external radio antennas through a second multiplexer 46, or "antenna multiplexer" $MX_A$.

Since it may be that radio antennas for communication with different external networks 3, 5 are optimised for particular powers or frequency bands, it may still however, be the case that there will be more than one set of external antennas and more than one set of internal antennas, as illustrated in FIG. 3. In this case, when there are RF interfaces for more than one type of external network, the interfaces for one type of network will not be selectable by the antenna multiplexer for connection to an internal or external antenna for another type of network.

There may be any practical number of RF interfaces, but in the illustrated examples there is, for each of the two different external networks 3, 5 a first selected radio-frequency interface 151, 153 comprising a first duplex processor interface 190 and a first duplex antenna interface 180 connected respectively to the bi-directional processor 150 and to a first radio antenna 11, 12 which is an external radio antennas. For each of the two different external networks 3, 5 there is also a second selected radio-frequency interface 152, 154 comprising a second duplex processor interface 190 and a second duplex antenna interface 180 connected respectively to the bi-directional processor 150 and to a second radio antenna 21, 22, which is an internal or local radio antenna.

The processor and antenna multiplexers 45, 46 provide a switching system configured to switch any of the selectable radio-frequency interfaces 151,152 or 153,154 into connection between the processor 150 and the corresponding radio antenna 11,12,21,23 or 12,14,22,24 to maintain the external radio communications link when the network frequency band of operation changes and to maintain the local radio communications link when the local, device frequency band of operation changes.

To coordinate this, there is also a control system, referred to in FIG. 3 as a "controller" 47. Although the controller is illustrated as being a separate component from the bi-directional processor 150, the controller may be physically integrated on the same chip with the processor 150.

The control system 47 is connected 48 to the switching system 45, 46 and is configured to select which of the selectable RF interfaces 151-154 will be switched by the switching system so that the local or device frequency band of operation continues to be different from the external or network frequency band of operation when there is to be a change in the network frequency band of operation, for example owing to movement of the vehicle 106 relative to the external networks 3, 5.

The first selected radio-frequency interface is therefore one that is configured for duplex operation at the network frequency band of operation and the second selected radio-frequency interface is one that is configured for duplex operation at the device frequency band of operation, the bi-directional digital radio communications link, in use, thereby being provided through the first and second radio-frequency interfaces and the radio signal processor as the external and local radio communications links are maintained by the switching system under the control of the control system as the vehicle moves and the network frequency bands of operation change in accordance with the particular sequence of radio transceivers t1, t2, t3 or T1, T2, T3.

In this way, an initial uplink and downlink once established for each one of the external networks is maintained without interference between any of the radio transmissions inside or outside the vehicle. By employing the same RF interfaces with both internal and external antennas, needless duplication of RF interfaces is avoided.

The RF interfaces 151-154 may each be optimised for receive and transmit operation in a single band of operation, for example as illustrated for the receive and transmit paths 20, 30 of FIG. 2. FIG. 4 shows an optional feature of the invention, in which each receive and transmit path 120, 130 is frequency tuneable. In this case, the control system 47 is connected to switchable components within each RF interface 151-154. In this example, these switchable components are: a plurality of rf-switchable balun bands 268 within a transmit path balun 168; a plurality of rf-switchable saw filter bands 271 within a transmit path saw filter 171; a plurality of rf-switchable power amplifier bands 273 within a wide band RF transmit amplifier 173;

a plurality of rf-switchable low noise amplifier bands 285 within a low noise RF receive amplifier 185; a plurality of rf-switchable saw filter bands 285 within a receive path saw filter 185; and a plurality of rf-switchable balun bands 289 within a receive path balun 189.

Other components common to the transmit and receive paths 120, 130, such as the duplexer 180, may also require frequency tuning, and in this example, there is also a plurality of rf-switchable duplexer bands 280 within the duplexer 180 connected to the control system 47.

The particular choice of switchable components for controlling the frequency response of active or passive circuit components will, of course, depend on the particular design of the components used in the transmit and receive paths.

The components of each RF interface 151-154 provide a single transceiver having a transmit path 120 and a receive path 130. These paths extend between the duplex processor interface 190, which is at the processor multiplexer end of each path 120, 130, and an antenna duplexer 180, which is at the antenna multiplexer end of each path. The transmit path 120 receives a balanced differential digital signal 167 from the duplex processor interface 190 which passes through a balun 168 and is converted into a unbalanced single ended signal 169. The single ended signal is filtered by a saw filter 171, and the filtered signal 172 is then amplified by an RF wide band power amplifier 173. The output 174 from the power amplifier is provided to a transmit input TX 177 of the antenna duplexer 180.

Each antenna duplexer 180 has an RF transceiver input/output RF 181 that is connected to the antenna multiplexer 46 which is configured to provide and receive signals 183 to and from a selected one of the external antennas 11-14 or a selected one of the local antennas 21-24.

On the receive path 130, a receive output RX 184 from the duplexer 180 is provided to the low noise RF amplifier 185. The output 186 from the low noise amplifier is filtered by a saw filter 187, and the filtered signal 188, which is an unbalanced signal-ended signal, is then provided to a balun 189 and is converted into a balanced digital signal 199 and then provided to the duplex processor interface 190.

The transceiver interface 190 is connected by a data bus 193 to the bi-directional base band processor 150 through the processor multiplexer 45. Data signals 194, 195 conveyed through the multiplexer 45 between the transceiver and processor 150 include data sent to and received from the antenna 11-14 or 21-24 that is in use, as well as control signals including those for a digital-to-analog (DAC) output 196 from the transceiver interface 190 which is passed as an analog control signal directly to the RF wide band power amplifier 173 in use in order to control the gain of the amplifier and hence strength of the transmit signal 183 from the antenna 11-14 or 21-24 that is in use.

The duplex processor interface 190 also receives and provides balanced digital signals for transmit data TX_P and TX_N 191 and receive data RX_P and RX_N 192.

By using the frequency tuneable RF interfaces, it is possible to make a further reduction in the number of RF interfaces needed to cover a large number of possible different operating bands. Because the system employs the processor multiplexer and the antenna multiplexer, it is not necessary that each RF interface is tuneable for all possible bands. The main reason for this is that the bi-directional processor will, in most cases, be free to determine which bands will be used inside the vehicle, within the constraint that the local bands must not be the same as any external bands in use. When there are at least four bands to cover, it becomes sensible to provide frequency tuning capability for at least some of the RF interfaces. For example, when there are four bands to cover, there can be two RF interfaces with: (i) one being tuneable across each three bands none of which is the same as that for the other RF interface; or (ii) both being tuneable across two different bands, none of the bands being the same. The possible reduction in expensive components such as RF amplifiers is then even greater when a very large number of bands are to be covered.

In the embodiments of the invention described above, the local wireless communication device is inside a passenger compartment of a road going motor vehicle, here a car, for conveying at least one passenger. The electronic device may be a hand-held device, for example a personal communication device, for example a mobile phone, a tablet or laptop computer or any other type of hand-held device. The invention is, however applicable to other types of electronic device, including those permanently connected to the vehicle as part of the passenger compartment or instrument display and also to different types of vehicle having an internal compartment for conveying at least one passenger.

The local wireless communication device may, for example, be part of an electronic device such as a vehicle engine management system, an in-car audio entertainment system, or a built-in mobile telephony device. There may be a single wireless communication device inside the vehicle, however, the invention is applicable to cases where there is more than one such device, each device being assigned its own identifier such as an Internet Protocol (IP) address.

The disclosure described above maintains separation between frequency bands in use for local and external radio communication, thereby avoiding radio interference as the vehicle moves into and out of radio communication with different external radio transceivers. At the same time, the invention permits a simplification of the system architecture and switching control scheme for a given number of required number RF paths. The number of components can be reduced accordingly, thus reducing system cost and packaging space. The invention therefore provides a convenient vehicular radio communications system that provides one or more bi-directional digital radio communications links between a local wireless communication device inside a moving vehicle and one or more corresponding sequences of radio transceivers in external wireless networks.

The invention claimed is:

1. A vehicular radio communications system for establishing a bi-directional digital radio communications link between a local wireless communication device inside a moving vehicle and a sequence of radio transceivers in a wireless network external of said vehicle, said local device operating in any one of a plurality of different device frequency bands and said radio transceivers each operating in any one of a plurality of different network frequency bands such that different radio transceivers have different network frequency bands of operation, some or all of said device frequency bands being the same as some or all of said network frequency bands, wherein the vehicular radio communications system comprises:

a set of one or more external radio antennas for radio communication with said network, each external radio antenna being configured for operation in any of said network frequency bands and each being operable, to receive and transmit radio signals in, respectively, an external downlink and an external uplink thereby providing an external radio communications link based on said network frequency band of operation, said network frequency band of operation changing in accordance with said sequence of radio transceivers as said vehicle moves;

a set of one or more local radio antennas for radio communication with said local device, each local radio antenna being configured for operation in any of said device frequency bands and each being operable, in use, to receive and transmit radio signals in, respectively, a local downlink and a local uplink thereby providing, in use, a local radio communications link using said device frequency band of operation, said device frequency band of operation changing in accordance with said changes in said network frequency band of operation so as to be different from said network frequency band of operation;

a bi-directional processor configured to process signals received from the local downlink for transmission in the external uplink and to process signals received from the external downlink for transmission in the local uplink;

a plurality of selectable radio-frequency interfaces, each one of said radio-frequency interfaces being configured for operation in a different frequency band and comprising a duplex processor interface and a duplex antenna interface, said duplex processor interface being selectively connectable to said processor and said duplex antenna interface being selectively connectable to any of said radio antennas of both of said sets of antennas, and said plurality of radio-frequency interfaces comprises: (i) a first selected radio-frequency interface comprising a first duplex processor interface and a first duplex antenna interface connected respectively to said processor and to a first radio antenna, said first radio antenna being in said set of external radio antennas; and (ii) a second selected radio-frequency interface comprising a second duplex processor interface and a second duplex antenna interface connected respectively to said processor and to a second radio antenna, said second radio antenna being in said set of local radio antennas;

a switching system configured to switch any of said selectable radio-frequency interfaces into connection between said processor and the corresponding radio antenna to maintain the external radio communications link when the network frequency band of operation changes and to maintain the local radio communications link when the device frequency band of operation changes;

a control system, the control system being connected to the switching system and being configured to select which of said selectable radio-frequency interfaces will be switched by the switching system so that the device frequency band of operation continues to be different from the network frequency band of operation when there is to be a change in the network frequency band of operation, whereby the first selected radio-frequency interface is one that is configured for duplex operation at the network frequency band of operation and the second selected radio-frequency interface is one that is configured for duplex operation at the device frequency band of operation, said bi-directional digital radio communications link, in use, thereby being provided through said first and second radio-frequency interfaces and said bi-directional processor as said external and local radio communications links are maintained by the switching system under the control of the control system.

2. A vehicular radio communications system as claimed in claim 1, wherein at least two radio antennas in said set of external radio antennas;
the at least two radio antennas are in a set of internal radio antennas; and
said plurality of radio-frequency interfaces comprises:
  (i) a third selected radio-frequency interface comprising a third duplex processor interface and a third duplex antenna interface connected respectively to said processor and to a third radio antenna, said third radio antenna being in said set of external radio antennas; and
  (ii) a fourth selected radio-frequency interface comprising a fourth duplex processor interface and a fourth duplex antenna interface connected respectively to said processor and to a fourth radio antenna, said fourth radio antenna being in said set of local radio antennas.

3. A vehicular radio communications system as claimed in claim 1, wherein each of the selectable radio-frequency interfaces is configured for fixed operation in a single frequency band.

4. A vehicular radio communications system as claimed in claim 1, wherein each of the radio-frequency interfaces is a tuneable multi-frequency interface configured for frequency tuneable operation in a plurality of different frequencies bands.

5. A vehicular radio communications system as claimed in claim 4, wherein the control system is operatively connected to each tuneable multi-frequency interface, and the control system controls the frequency response of each interface to the required frequency band of operation.

6. A vehicular radio communications system as claimed in claim 5, wherein each of said radio-frequency interfaces comprises a frequency adjustment system for adjusting the operational frequency of filters and/or amplifiers of said interface and the control system is connected to each of said frequency adjustment systems and is configured to coordinate the adjustment of said operational frequencies of said of filters and/or amplifiers in accordance with said changes in said frequency bands to be used.

7. A vehicular radio communications system as claimed in claim 5, wherein the control system changes the frequency response of a receiver amplifier and/or the transmitter amplifier within the radio-frequency interface to match said changes in the network frequency band of operation.

8. A vehicular radio communications system as claimed in claim 5, wherein the control system is operable, in use, to change the frequency response of at least one frequency filter circuit selectably linkable to the receiver amplifier and/or at least one selectable frequency filter circuit selectably linkable to the transmitter amplifier, the control system being operable, in use, to select which of said frequency filter circuits is linked to said amplifiers in order to change said frequency response of the receiver amplifier and/or the transmitter amplifier.

9. A vehicular radio communications system as claimed in claim 1, wherein each radio-frequency interface comprises between the duplex processor interface and the duplex antenna interface a transceiver system, the transceiver system comprising a transceiver amplifier circuit, said circuit comprising a receive path and a transmit path, the receive path including a receiver amplifier being configured to amplify a downlink radio signal received from the duplex antenna interface and to provide said amplified signal to the duplex processor interface, and the transmit path including a transmitter amplifier being configured to amplify an uplink radio signal received from the duplex antenna interface and to provide said amplified signal to the duplex antenna interface.

10. A vehicular radio communications system as claimed in claim 1, wherein the switching system comprises, between said radio frequency interfaces and the bi-directional processor, a processor multiplexer.

11. A vehicular radio communications system as claimed in claim 1, wherein the processor multiplexer is connected to the duplex processor interface.

12. A vehicular radio communications system as claimed in claim 10, wherein the processor multiplexer is connected to a coder/decoder interface of the bi-directional processor.

13. A vehicular radio communications system as claimed in claim 10, wherein the switching system comprises, between said radio frequency interfaces and the sets of antennas, an antenna multiplexer.

* * * * *